(12) United States Patent
Yuval (10) Patent No.: US 7,639,834 B2
(45) Date of Patent: *Dec. 29, 2009

(54) SOFTWARE ANTI-PIRACY SYSTEMS AND METHODS UTILIZING CERTIFICATES WITH DIGITAL CONTENT

(75) Inventor: Gideon A. Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

This patent is subject to a terminal disclaimer.

(21) Appl. No.: 11/279,851

(22) Filed: Apr. 14, 2006

(65) Prior Publication Data

US 2006/0174128 A1 Aug. 3, 2006

Related U.S. Application Data

(63) Continuation of application No. 09/848,468, filed on May 2, 2001, now Pat. No. 7,043,050.

(51) Int. Cl.
G06K 9/00 (2006.01)
H04N 1/40 (2006.01)
H04L 9/00 (2006.01)

(52) U.S. Cl. .................... 382/100; 358/3.28; 713/176

(58) Field of Classification Search .............. 382/100, 382/135, 112, 306; 358/3.29, 3.28; 350/50, 350/201; 704/207, 222; 713/76; 283/113; 380/54

See application file for complete search history.

(56) References Cited

U.S. PATENT DOCUMENTS

| 5,822,432 | A | 10/1998 | Moskowitz et al. |
| 5,832,119 | A | 11/1998 | Rhoads |
| 6,285,775 | B1 | 9/2001 | Wu et al. |
| 6,345,256 | B1 | 2/2002 | Milsted et al. |
| 6,385,728 | B1 | 5/2002 | DeBry |
| 6,425,082 | B1 | 7/2002 | Matsui et al. |
| 6,556,688 | B1 | 4/2003 | Ratnakar |
| 6,574,609 | B1 | 6/2003 | Downs et al. |
| 6,633,653 | B1 | 10/2003 | Hobson et al. |
| 6,640,304 | B2 | 10/2003 | Ginter et al. |
| 6,674,874 | B1 | 1/2004 | Yoshida et al. |
| 7,043,050 | B2 * | 5/2006 | Yuval .................. 382/100 |

* cited by examiner

Primary Examiner—Yon Couso
(74) Attorney, Agent, or Firm—Lee & Hayes, PLLC (57) ABSTRACT

Systems and methods are described herein for embedding and detecting a watermark in a digital content file, such as an audio file or a video file. If the watermark is detected in the digital content, a certificate associated with the digital content is located. The certificate contains copyright information that indicates permissible uses of the digital content file, e.g., the digital content file may be played one time, five times, any number of times during a specified time period, etc. If the watermark is not detected, the file is processed. In one implementation, a device configured to process the digital content file is also configured to locate a certificate associated with the digital content file before processing it. If the certificate is not found, the file is not played. If the certificate is found, the device only processes the file in accordance with instructions in the associated certificate.

15 Claims, 6 Drawing Sheets

SOFTWARE ANTI-PIRACY SYSTEMS AND METHODS UTILIZING CERTIFICATES WITH DIGITAL CONTENT

CROSS-REFERENCE TO RELATED APPLICATION(S)

This U.S. Nonprovisional patent application is a continuation application of U.S. Nonprovisional patent application Ser. No. 09/848,468, filed 2 May 2001, which is hereby incorporated by reference in its entirety herein.

TECHNICAL FIELD

The systems and methods described herein generally relate to preventing unauthorized use of digital content, such as audio, images, video, text, multimedia, etc. More particularly, the systems and methods described herein relate to utilizing a digital certificate associated with a digital content file that includes an embedded digital watermark.

BACKGROUND

Digital audio and video signals offer many advantages over conventional media in terms of audio quality and ease of transmission. With the ever-increasing popularity of the Internet, digital content—such as a multimedia clip—has become a mainstay ingredient of the Web experience, buoyed by such advances as the increasing speed at which data is carried over the Internet and improvements in Internet multimedia technology for playing such multimedia clips. Every day, numerous digital content files are added to Web sites around the world.

As used herein, digital content and digital content file indicate a digital file or a digital signal (or bit stream), in whole or part, which embodies multimedia content, including audio, video, images and text. A digital content file may be stored and retrieved, transmitted and received, or the like. The following discussion will refer to one or more digital content files, although it should be understood that reference to a digital content file is a reference to any digital content that may be stored in memory and/or transmitted from a first party to a second party.

The transmission and "sharing" of digital content files has become increasingly more efficient, so have illegal acts of piracy, i.e., illegal sharing, involving digital content files. For example, an imposter may download a digital content file from the Internet, claim the work for his own, and sell the work to unsuspecting consumers. In such an instance, the true owner of the work represented in the digital content file loses out on monetary gain as well as proper recognition as the creator of the content. Additionally, the consumer is denied the security of obtaining authentic multimedia content from the true owner or creator of the content. Furthermore, the true owner of the work contained in the digital content file loses control over how the work is used, e.g., limited/unlimited playing, copying, etc. In many cases, imposters attempt to dupe devices rather than people. For example, an imposter's goal may be to create a counterfeit digital content file that will play on a "good machine," i.e., a device that is designed to play only authentic content.

One way that has been utilized to protect an owner of digital content from piracy is known as "watermarking" or digital watermarking. A digital watermark is a digital sequence that is embedded into digital content but is imperceptible when the content is played. The watermark is virtually unremovable from the content, meaning that if the watermark is removed, the perceptual quality of the digital content is significantly altered.

The main application of digital watermarking is the protection of intellectual property rights. Watermarking allows for embedding a copyright label into the content that can identify the true copyright owner and, in some cases, identify permissible uses of the content. In the example given above, if the digital content file that is downloaded from the Internet contains a digital watermark, then the pirate cannot claim the work as his own unless there is a way for the pirate to remove the watermark before claiming the work as his own. However, watermarks are designed so that they are virtually impossible to remove.

A problem with traditional watermarking techniques is that it is a difficult task to create and embed a watermark that can be reliably protected and that cannot be easily removed. Increasing the amount of information contained in a watermark means increasing the size of the watermark. Increasing the size of the watermark means increasing the difficulty of embedding the watermark in digital content so that it is difficult to remove without destroying the content.

Current SDMI (Secure Digital Music Initiative) standards dictate that a watermark signal should have a length of seventy-two (72) bits. This finite number of bits necessarily limits the amount of information contained in the watermark signal. Therefore, a copyright owner does not have a great amount of flexibility to dictate permissible use of the digital content.

Figure 1:
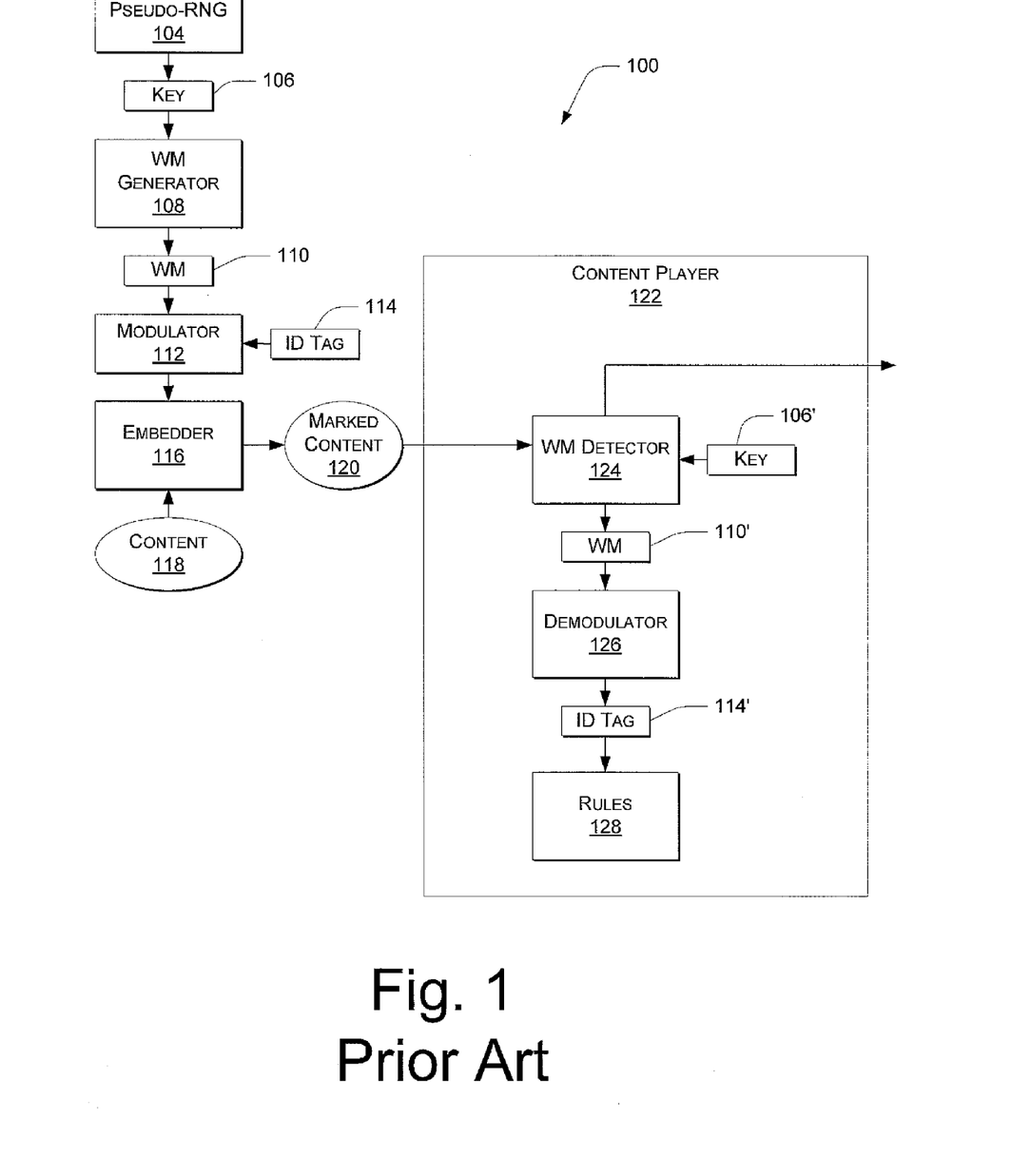
FIG. 1 is a schematic block diagram of a prior art watermarking system.

FIG. 1 is a schematic block diagram of a prior art watermarking system 100. A pseudo-random number generator 104 generates a key 106 that is used by a watermark generator 108 to produce a watermark 110. A modulator 112 incorporates an ID (identification) tag 114 into the watermark 110. An embedder 116 incorporates the watermark 110 into a digital content file 118 to produced marked content 120.

The system 110 includes a content player 122 that includes a watermark detector 124 that is designed to look for an embedded watermark in a digital content file. The content player 122 includes a copy of the key 106' that was used to create the watermark 110. The watermark detector 124 uses the key 106' to determine if the marked content 120 contains the watermark 110'.

If the watermark 110' is detected in the marked content 120, a demodulator 126 processes the watermark 110' to determine the ID tag 114' and, hence, the copyright owner. The ID tag 114' is utilized to locate a rules document 128 that identifies legitimate uses of the marked content 120. If the content player 122 is authorized by the rules document 128 to play/copy the marked content 120, then the marked content 120 is played and/or copied by the content player 122. If the watermark detector 124 does not detect the watermark 110' in content (not shown) input to the content player 122, then the content player 122 either allows unlimited use of the content or it does not process the unmarked content.

The previous example of a prior art watermark detection system is given for exemplary purposes only. It is noted that the description is not intended to identify a single system or an exclusive method of generating, embedding and/or detecting a watermark in digital content. Rather, the description of the exemplary system is intended to provide a general background for the detailed description of the invention(s) that is follow. Those skilled in the art will understand that the described watermark detection system may be implemented in numerous ways with numerous variations to the described system.

SUMMARY

Anti-piracy systems and methods are described herein that utilize digital certificates associated with digital content files to provide copyright information about the digital content file. In one implementation, a watermark from one to several bits in length is embedded in a digital content file. If an electronic device detects the watermark, then a certificate associated with the digital content file is located. The digital content file is then processed according to copyright information contained in the certificate. For example, the certificate may allow the device to play the digital content one time, five times or an unlimited number of times. Or, the certificate may allow the digital content file to be played but not copied or copied one time and played an unlimited number of times. If no watermark is detected, the electronic device processes the digital content file. This allows the flexibility of processing public domain or legacy content produced prior to the availability of the described watermarking technique. If a watermark is detected but no corresponding certificate is found, an appropriate user message is displayed. If the search for a corresponding certificate is taking more time than expected, a user message including an option to cancel the search is provided.

In another implementation, no watermark is utilized. A content player is configured to search for a certificate associated with any digital content file that is requested to be processed. If no certificate can be located for a digital content file, then the digital content file is not processed. If a certificate is found, the digital content file is processed according to the rights granted in the certificate. Use of this implementation instead of the previously described implementation limits the flexibility of a content player to process digital content that does not have a certificate associated with it, i.e., public domain works or legacy content produced prior to availability of the described technology. However, should such an implementation become a standard method of processing digital content, then public domain works in digital form would have certificates associated with them to indicate that they are in the public domain. Legacy works would have new certificates created for and associated with them.

A digital certificate contains a relatively few number of bits to transmit to the electronic device and, therefore, it is not a burden to transmit the certificate over a network, such as the Internet. In addition, a copyright owner has the flexibility to define different uses of a digital content file for different devices. For instance, one user may pay one fee for unlimited use of a digital content file, while another user may pay a lower fee for play-only rights to the digital content. In one implementation, a certificate allows an associated digital content file to be played for a specified time period, such as for a certain number of days after the digital content file is downloaded or until a specified date.

Furthermore, a copyright owner is able to control use of the copyrighted work after the work is under the control of another party. Modifications can be made to a certificate to modify a user's rights to the digital content. For example, a user might first have a trial version of the content that allows the user to play the content an unlimited number of times for one week. If the user desires, the user may then pay for and download a new certificate that grants extended rights to the user. Instead of downloading, for instance, a music file of approximately 5 Mb, all that is required is the download of a modified certificate containing approximately 1 Kb of data, which can conclude within a matter of seconds.

This summary itself is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth one or more specific embodiments of anti-piracy systems and methods that utilize certificates associated with digital content files. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of anti-piracy systems and methods utilizing certificates with digital content files. Applicant intends these exemplary implementations to be examples only. Applicant does not intend these exemplary implementations to limit the scope of the claimed present invention(s). Rather, Applicant has contemplated that the claimed present invention(s) might also be embodied and implemented in other ways, in conjunction with other present or future technologies.

INCORPORATION BY REFERENCE

The following co-pending patent applications are incorporated by reference herein:

U.S. patent application Ser. No. 09/421,986, entitled "System and Method for Hashing Digital Signals" filed on Oct. 19, 1999, and assigned to the Microsoft Corporation; and U.S. patent application Ser. No. 09/795,275 entitled "Asymmetric Spread-Spectrum Watermarking Systems And Methods Of Use" filed on Feb. 27, 2001, and assigned to the Microsoft Corporation, which is incorporated by reference Introduction Implementations of the systems and methods described herein may be implemented (in whole or in part) by a 1-bit watermarking system utilizing certificates associated with digital content files like that shown in FIG. 2, by a system utilizing certificates associated with digital content files like that shown in FIG. 3, or by a computing environment like that shown in FIG. 6.

An exemplary implementation is described below as a 1-bit watermarking technique for preventing unauthorized use of digital content. This exemplary implementation includes embedding a 1-bit watermark into digital content to indicate that there is a certificate associated with the digital content that outlines copyright privileges. This exemplary implementation also includes looking for a 1-bit watermark in digital content and, if the 1-bit watermark is detected, locating a certificate associated with the digital content to determine copyright privileges for the digital content. If the 1-bit watermark is not found in the digital content, the digital content is processed without referencing an associated certificate.

Although the implementation described above utilizes a 1-bit watermark, those skilled in the art will recognize that the system may be implemented with a watermark of greater than one bit. For example, the watermark may comprise two bits, several bits, etc. Any number of bits less than the standardized 72-bit watermark may be used to decrease the amount of watermark information required to be present in watermarked content.

Another exemplary implementation is described below as an anti-piracy technique that associates a certificate with digital content to identify copyright privileges related to the digital content. A content player is configured to look for a certificate associated with a digital content file that has been requested to be processed. If the certificate is found, the digital content file is processed according to the copyright information contained in the certificate. If a certificate cannot be located for the digital content file, then the digital content file is not processed.

Exemplary 1-Bit Watermarking System

Figure 2:
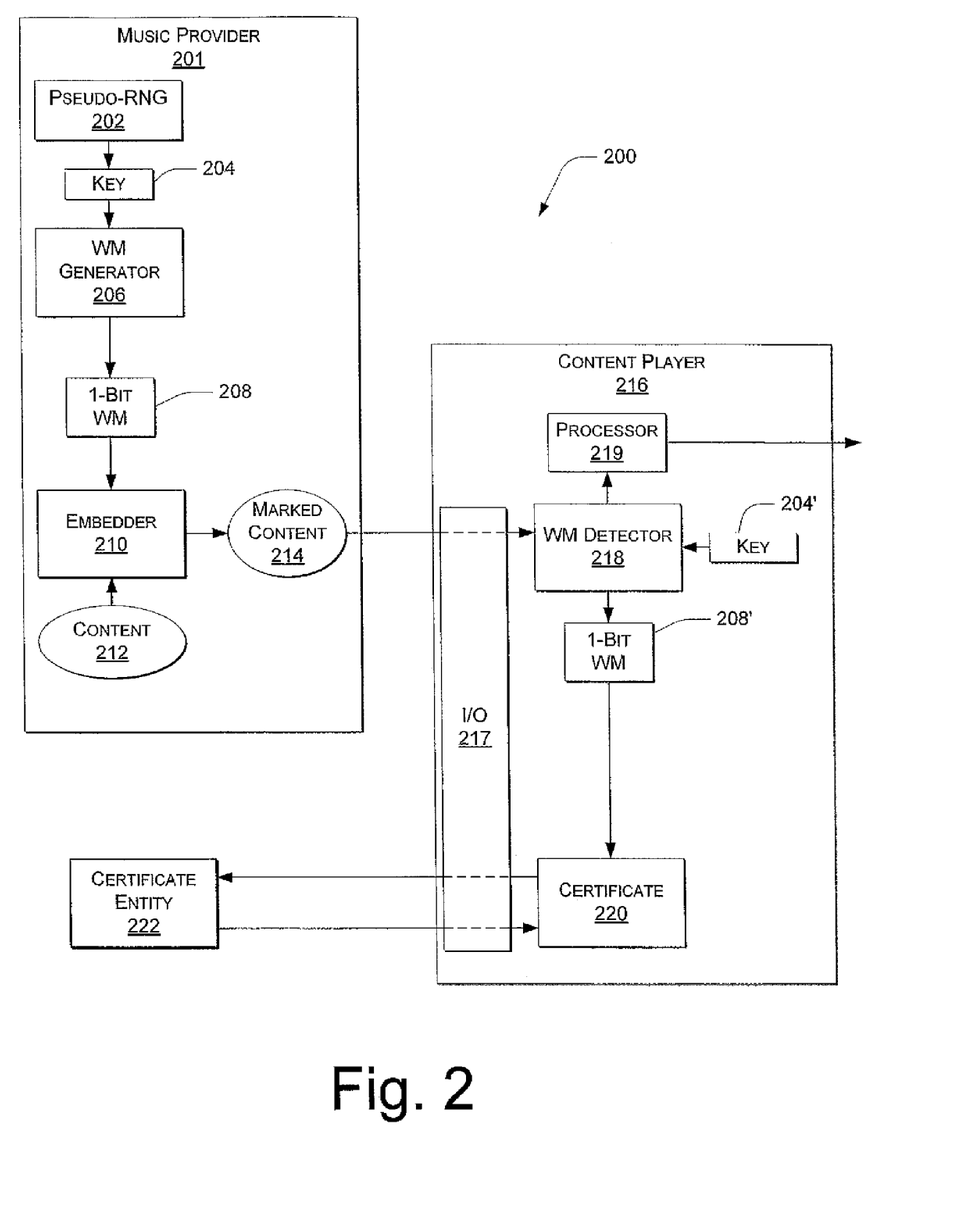
FIG. 2 is a schematic block diagram of a 1-bit watermarking system utilizing certificates associated with digital content files.

FIG. 2 shows a 1-bit watermarking system 200 that utilizes certificates to determine rights and to deter software piracy. The 1-bit watermarking system 200 includes a music provider 201 that has pseudo-random number generator 202 that generates a key 204, which is used in a watermark generator 206 to produce a 1-bit watermark 208. An embedder 210 embeds the 1-bit watermark 208 into digital content 212 to create marked content 214.

The 1-bit watermark 208 may be generated and embedded into the digital content 212 by any method known in the art. The private key 204 may be used as shown, or the 1-bit watermark 208 maybe associated with a public key (not shown) as described in U.S. patent application Ser. No. 09/795,275 entitled "Asymmetric Spread-Spectrum Watermarking Systems And Methods Of Use" filed on Feb. 27, 2001, and assigned to the Microsoft Corporation, which is incorporated by reference above.

The 1-bit watermark 208 is embedded into the digital content 212 in such a way that the 1-bit watermark 208 is difficult to alter or remove without damaging the digital content 212. Preferably, the 1-bit watermark 208 is embedded into the digital content 212 in such a way as to make the digital content 212 perceptibly different if the watermark is removed or altered.

The marked content 214 is shown being transmitted from the music provider 201 to a content player 216, where it is received via an input/output (I/O) module 217 included in the content player 216. It is noted, however, that the following discussion will present the remaining features of the watermark system 200 as if the content player 216 is requested to process a digital content file, whether the file is marked or not. The discussion will, therefore, highlight an important feature of the 1-bit watermarking system 200 in its ability to reliably distinguish between marked and unmarked content.

The content player 216 includes a watermark detector 218 that is configured to search digital content for a 1-bit watermark and a processor 219. The key 204' is used in the watermark detector 218 to locate the 1-bit watermark. If as shown in FIG. 2, the 1-bit watermark 208' is detected in the marked content 214, then the content player 216 refers to a certificate 220 to determine if and how the content player 216 can process the marked content 214. As discussed previously, the present discussion focuses on a 1-bit watermark; however, it is noted that the watermark may comprise from two to several bits.

The certificate 220 is derived from a certificate entity 222. There are several techniques known in the art to locate the certificate 220 and to provide the certificate 220 to the content player 216. These techniques fall under the realm of Digital Rights Management ("DRM"), which pertains to exchange of protected information utilizing cryptography, certificates, secure wrappers, etc. The certificate 220 may be transmitted from the same entity that transmits the marked content 214 to the content player 216, or the marked content 214 and the certificate 220 may originate from different entities. The certificate 220 may be transmitted together with the marked content 216 or it may be transmitted separately, at the same or different time as the marked content 216.

It is not necessary to specify the manner in which the certificate 220 is located and transmitted to the content player 216 in the description of the present invention(s). Any manner known in the art by which the certificate 220 may be located and transmitted to the content player 216 may be utilized. As long as the content player 216 can locate the certificate 220 that is associated with the marked content 214, the present invention(s) may be implemented as described.

It is also noted that the content player 216 must include means to identify and correlate the marked content 214 and the certificate 220. For this example, it is assumed that the watermark detector 218 performs the identification and correlation in conjunction with the processor 219. There are several techniques known in the art for accomplishing the identification and correlation. One such technique involves comparing hash values of content or signals to identify content. Such a technique is described in U.S. patent application Ser. No. 09/421,986, entitled "System and Method for Hashing Digital Signal", filed Oct. 19, 1999, and assigned to the Microsoft Corporation, which is incorporated by reference above.

The hashing technique generates the same unique identifier (e.g., hash value) for digital content files if the digital content files produce an output that is perceptually the same to a human listener. However, if altered content is perceptually different from the original content, then the hashing technique recognizes such a degree of change and a different hash value will be produced for the altered content than a hash value produced for the original signal.

Other hashing techniques may be utilized to accomplish the same objective. One such other hashing technique is described in U.S. patent application Ser. No. 09/421,986, entitled "System and Method for Hashing Digital Signals", which is assigned to the Microsoft Corp. and is incorporated by reference, above.

A methodological implementation of the exemplary 1-bit watermarking system 200 shown in FIG. 2 will be described in detail, below, with reference to FIG. 3.

Methodological Implementation of the Exemplary 1-Bit Watermarking System

Figure 3:
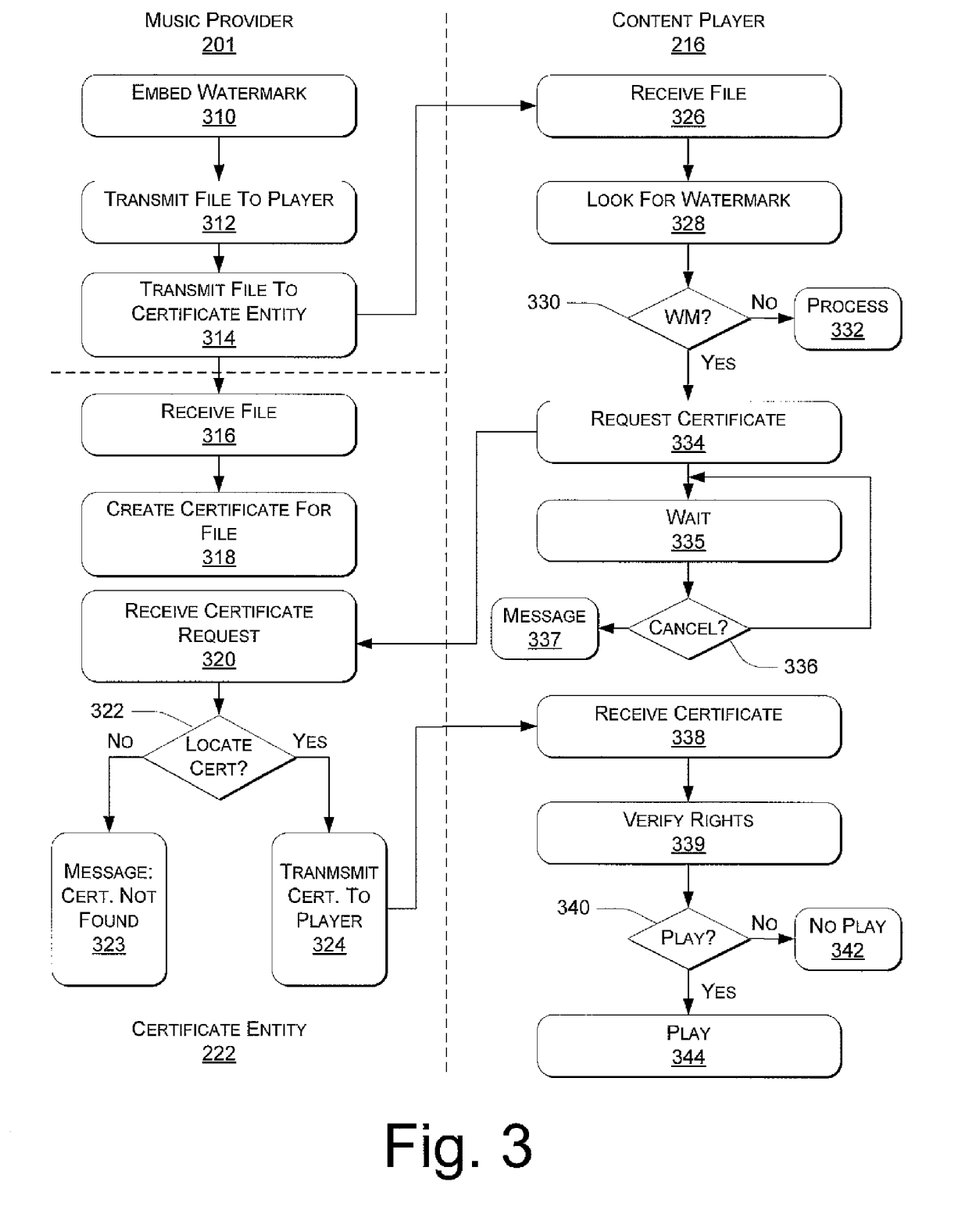
FIG. 3 is a block diagram of a system utilizing certificates associated with digital content files.

FIG. 3 shows a methodological implementation of the exemplary 1-bit water-marking system performed (in whole in part) by the 1-bit watermarking system 200 (or some portion thereof) shown in FIG. 2. This methodological implementation may be performed in software, hardware, or a combination thereof. Continuing reference will be made to the features and reference numerals of FIG. 2 in the discussion of FIG. 3.

The methodological implementation shown in FIG. 3 describes tasks that are performed by one of three entities: the music provider 201, the certificate entity 222, or the content player 216. It is noted, however, that some of the tasks may be performed by an entity other than that shown. The particular division of tasks shown is by way of example only.

The music provider 201 embeds the 1-bit watermark in digital content at block 310. In the example described herein, the digital content is an audio file, although the digital content, in practice, may be any digital content file, such as video, image or text. The watermarked audio file is transmitted to the content player 216 at block 312, and to the certificate entity 222 at block 314.

It is noted that the audio file may not be transmitted directly to the content player 216 and the certificate entity 222 but may first pass through one or more intermediaries (not shown). In addition, the music provider 201 and the certificate entity 222 could be the same entity. In such a case, the content file is not transmitted to a certificate entity; instead, the certificate is produced and stored at the music provider 201. Typically, however, it is anticipate that a user will obtain the audio file from the music provider 201 and will then connect with the certificate entity 222 to obtain the certificate 220 associated with the audio file.

At block 316, the certificate entity 222 receives the marked content 214 from the music provider 201. The certificate 220 then created for the marked content 214 and is associated therewith at block 318. It is noted that the certificate 220 may not be created immediately upon receipt of the marked content 214. Instead, the certificate 220 may be created when a user obtains the marked content 214. At this time, the certificate entity 222 can create a certificate 220 especially for the user considering rights granted to the user. Alternatively, there may be multiple, unique certificates that are created for the marked content 214. The certificate entity 222 in such a circumstance will provide the appropriate certificate to the user at the appropriate time.

At block 326, the content player 216 receives the marked content 214. The watermark detector 218 attempts to locate the 1-bit watermark 208' at block 328. If no watermark is found ("No" branch, block 330), then the content player 216 processes the content as requested at block 332. If, however, the watermark 308' is detected ("Yes" branch, block 330), then the content player 216 makes a request for a certificate 220 associated with the marked content 214 (block 334).

The content player 216 waits for the certificate entity 222 to return a valid certificate 220 associated with the marked content 214 at block 335. If the certificate 220 is not received within a specified period of time, then a cancel option is provided by the content player 216 at block 336. If the search is canceled ("Yes" branch, block 336), then the process is discontinued and a notification message is issued at block 337. As long as the search is not canceled ("No" branch, block 336), then the process waits at block 335.

At block 320, the certificate entity 222 receives the certificate requests and attempts to locate the certificate 220 (block 322). If the certificate 220 cannot be found ("No" branch, block 322), then an error message is produced at block 323 indicating that a valid certificate 220 associated with the marked content 214 could not be located. If the certificate 220 is located ("Yes" branch, block 322), then the certificate 220 is then transmitted to the content player 216 at block 324.

It is assumed for this example that there is a certificate associated with the content file that is accessible by the certificate entity 222. In one implementation, the certificate entity 222 is configured to locate a certificate at a remote site. If, for some reason, a certificate cannot be located for the content, then an error message is returned to the content player 216.

At block 338, the content player 216 receives the requested certificate 220 from the certificate entity 222. The certificate 220 is a digital document that contains copyright information about the marked content 214. The copyright information in the certificate 220 outlines the permissible uses of the marked content 214.

The certificate 220 is matched with the marked content 214 (such as with the hashing scheme referenced above) and the permissible uses, or rights, contained in the certificate are verified (block 339). At block 340, the content player 216 determines if it has authority to process (play or copy) the marked content 214. If the certificate does not grant the content player 216 the right to process the marked content 214 as requested ("No" branch, block 340), then the marked content 214 is not processed (block 342). If the requested use of the marked content 214 is allowed according to the certificate 220 ("Yes" branch, block 340), then the marked content 214 is processed at block 344.

Exemplary System Utilizing Certificates Associated with Digital Content

Figure 4:
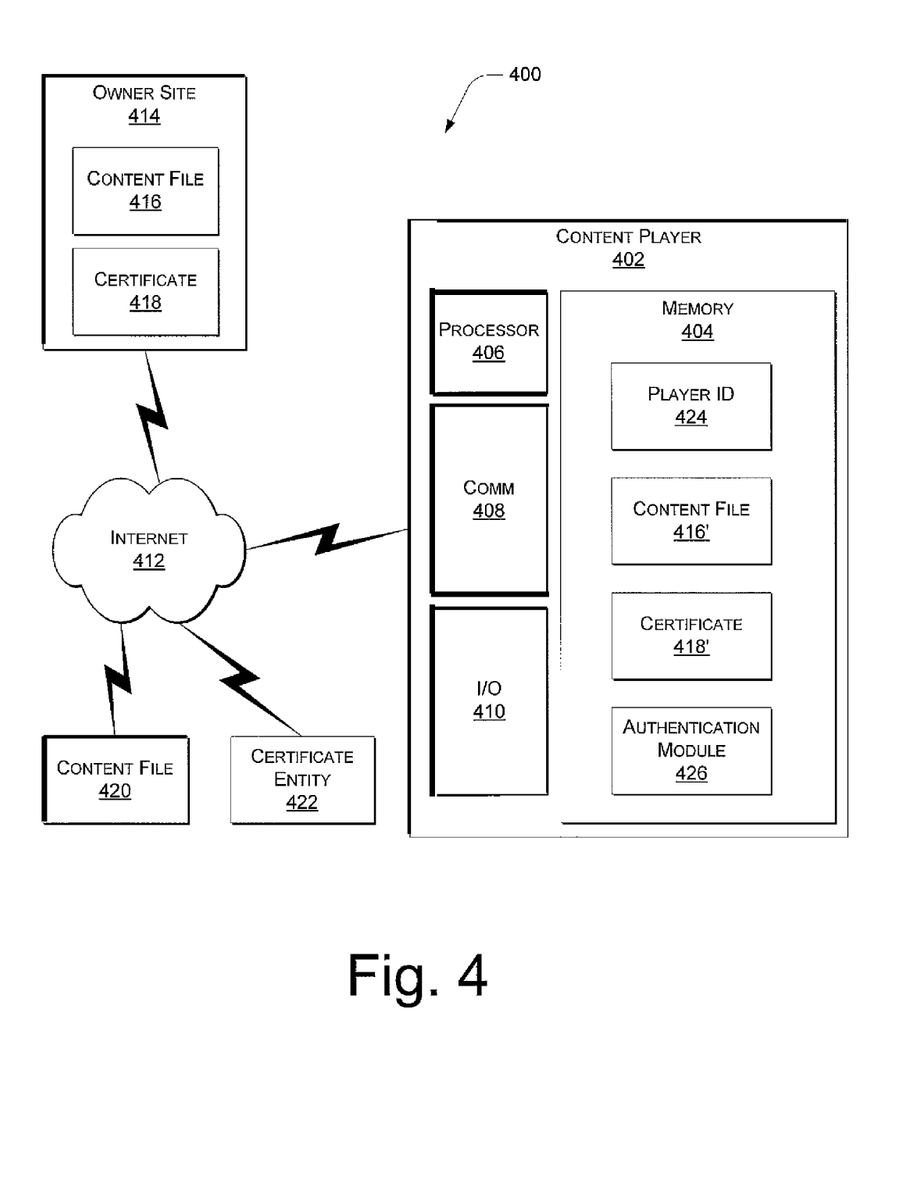
FIG. 4 is a flow diagram showing a methodological implementation of a 1-bit watermarking system utilizing certificates associated with digital content files.

FIG. 4 is a block diagram that depicts a system 400 that utilizes certificates associated with digital content to determine user rights and to deter software piracy. The system 400 includes a content player 402 having memory 404, a processor 406, a communications module 408 and an input/output (I/O) module 410. The content player 402 is connected to the Internet 412 and communicates with the Internet 412 via the communications module 408. It is noted that although the content player 402 is shown connected to the Internet 412, the content player 402 may communicate with any other type of network, including but not limited to, a local area network (LAN), a wide area network (WAN), or the like.

Also included in the system 400 is a content owner site 414 that communicates with the Internet 412. The content owner site 414 includes a content file 416 and a certificate 418. The certificate 418 is associated with the content file 416 and contains copyright information about the content file 416 and permissible uses thereof. It is noted that although only one content file and certificate are shown at the content owner site 414, the content owner site 414 may contain virtually any number of content files and certificates.

It is also noted that the content owner site 414 may only contain content files and/or certificates and that the corresponding certificates/content files may be stored at another location. To better illustrate this alternative implementation, a content file 420 and a certificate entity 422 are shown at other sites on the Internet 412. This implementation will be discussed in greater detail below.

The memory 404 of the content player 402 stores a player ID 424 that uniquely identifies the content player 402 and an authentication module 426. A copy of the content file 416' and a copy of the certificate 418' are also stored in the memory 404. Further aspects of the components stored in the memory 404 will be discussed at length in the following discussion.

The content player 402 is configured to receive the content file 416' into the memory 404. When a request is made to process the content file 416', the authentication module 426 is configured to locate the certificate 418' that is associated with the content file 416'. In the present example, the content file 418' is downloaded from the content owner site 414, although in one implementation, the certificate 418' is located and downloaded from the certificate entity 422. Once the certificate 418' has been stored in the memory 404, the authentication module 426 validates the contents of the certificate 418' and determines if the content player 402 is authorized to process the content file 416' in accordance with the request. If so, the content file 416' is processed as requested; if not, the content file 416' is not processed.

The player ID 424 is an optional implementation that allows the content owner site 414 to include the player ID 424 in the certificate 418. According to this implementation, the content file 416' may only be processed by the content player 402 that has the player ID 424 that is described in the certificate 418. As a result, even if the content file 416' and the certificate 418' are transferred to another content player (not shown), then the other content player would not be able to process the content file 416' because that content player would have a different player ID (or no player ID) that would not match the player ID 424 included in the certificate 418'.

It is noted that in the system 400 shown in FIG. 4, the content player 402 does not have the ability to play content that does not have a certificate associated with it, i.e., public domain content, legacy content, etc. Unless such content has certificates created for them (including a certificate indicating that a content file is in the public domain), the content player 402 loses the flexibility to process these types of content files.

Figure 5:
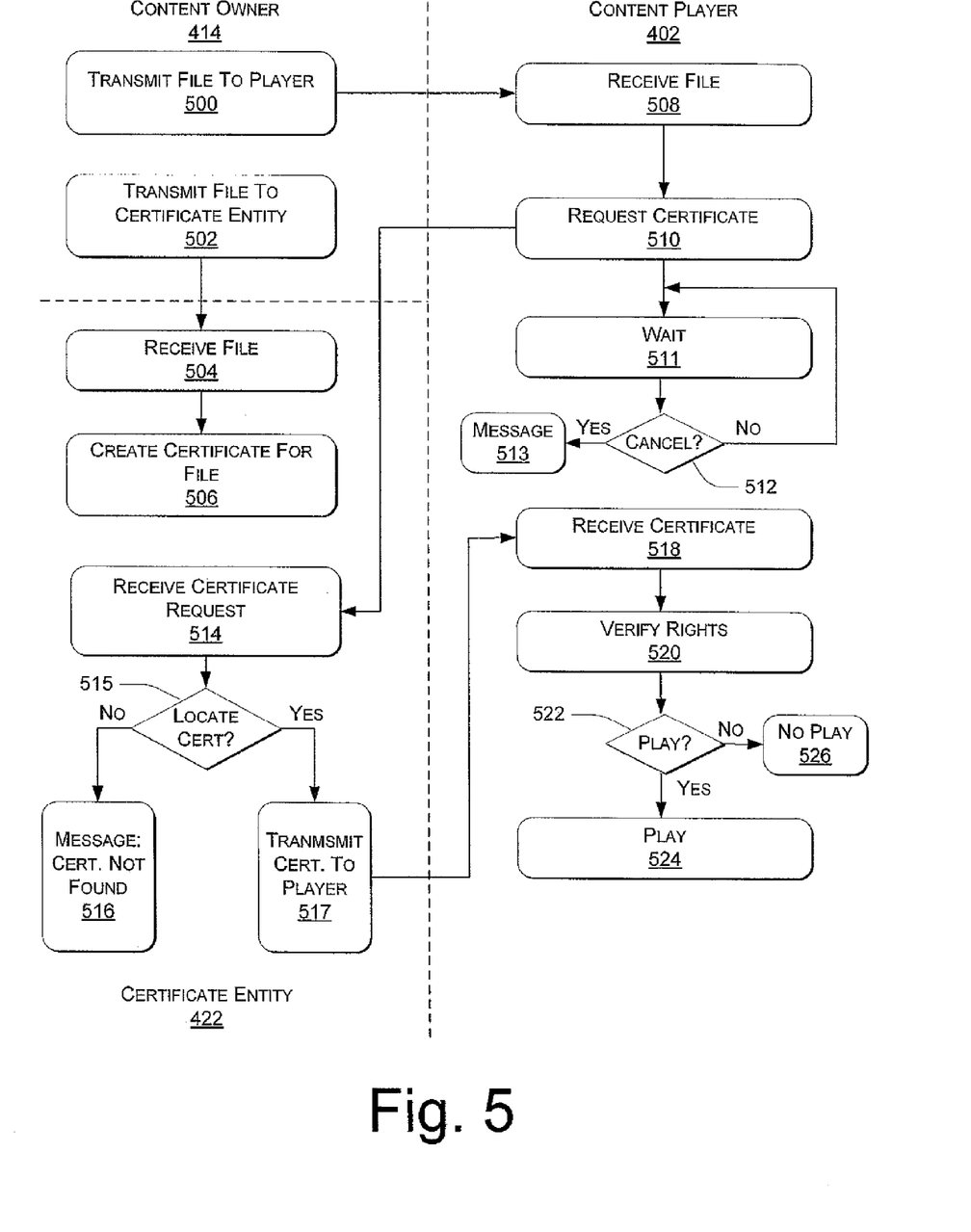
FIG. 5 is a flow diagram showing a methodological implementation of a system utilizing certificates associated with digital content files.

Methodological Implementation of the System Utilizing Certificates Associated with Digital Content FIG. 5 shows a methodological implementation of the system 400 depicted in FIG. 4. This methodological implementation may be performed in software, hardware, or a combination thereof. Continuing reference will be made to the features and reference numerals of FIG. 4 in the discussion of FIG. 5.

The methodological implementation shown in FIG. 5 describes tasks that are performed by one of three entities the content owner 414, the certificate entity 422, or the content player 402. It is noted, however, that some of the tasks may be performed at an entity other than that shown. For example, the tasks attributed to the certificate entity 422 may be performed by the content owner 414 utilizing the certificate 418 located at the content owner site 414. The particular division of tasks shown is by way of example only.

The content owner 414 transmits the content file 416 to the content player 422 at block 500. The content file 416 is also transmitted to the certificate entity 422 at block 502. It is noted that the task shown in block 502 is not required if the content owner site 414 controls the certificate 418 instead of communicating with the certificate entity 422. However, for discussion purposes, the present example assumes that the content owner 414 communicates with the certificate entity 422 (which creates or has a copy of the certificate 418).

It is noted that the content file 416 may not be transmitted directly to the content player 402 and the certificate entity 422 but may first pass through one or more intermediaries (not shown). For the present example, it is contemplated that a typical user will obtain the content file 416 from the content owner 414 and will then connect with the certificate entity 422 to obtain the certificate 418 associated with the content file 416.

At block 504, the certificate entity 422 receives the content file 416 from the content owner 414. The certificate 418 is then created for the content file 416 and is associated therewith at block 506. It is noted that the certificate 418 may not be created immediately upon receipt of the content file 416. Instead, the certificate 418 may be created when a user obtains the content file 416. At this time, the certificate entity 422 can create the certificate 422 especially for the user considering rights granted to the user. Alternatively, there may be multiple, unique certificates that are created for the content file 416, each certificate containing different user rights. In such a circumstance, the certificate entity 422 provides the appropriate certificate to the user at the appropriate time.

At block 508, the content player 402 receives the content file 416 and stores the content file 416' in the memory 404. The authentication module 426 attempts to locate the certificate 418 associated with the content file 416' at block 510 by requesting the certificate 418 from the certificate entity 422. After the certificate request is made, the content player 402 waits for a response from the certificate entity 422 at block 511. If a certificate has not been located after a specified amount of time, an option to cancel is provided at step 512. If the search for the certificate 418 is canceled ("Yes" branch, block 512, then the process is canceled and a cancellation message is generated at block 513. If the process is not cancelled ("No" branch, block 512), then the content player 402 continues to wait (block 511) for the certificate entity 422 to respond to the request for a certificate.

The certificate entity 422 receives the certificate request (block 514) and attempt to locate the certificate 418. If the certificate 418 cannot be found ("No" branch, block 515), then an appropriate error message is generated at block 516. If the certificate 418 is located ("Yes" branch, step 515), then the certificate entity 422 transmits the certificate 418 to the content player 402 (block 517).

The content player 402 receives the certificate 418 at block 518 and stores the certificate 418' in the memory 404. At block 520, the authentication module 426 examines the certificate 418' to verify the permissive use(s) of the content file 416'. If the certificate 418' indicates that the content player 402 may process (play or copy) the content file 416' ("Yes" branch, block 522), then the content file 416' is played at block 524. If the certificate 418' indicates that the content player 402 may not process the content file 416' ("No" branch, block 522), then the content player 402 does not process the content file 416' (block 526).

Exemplary Computing System and Environment

Figure 6:
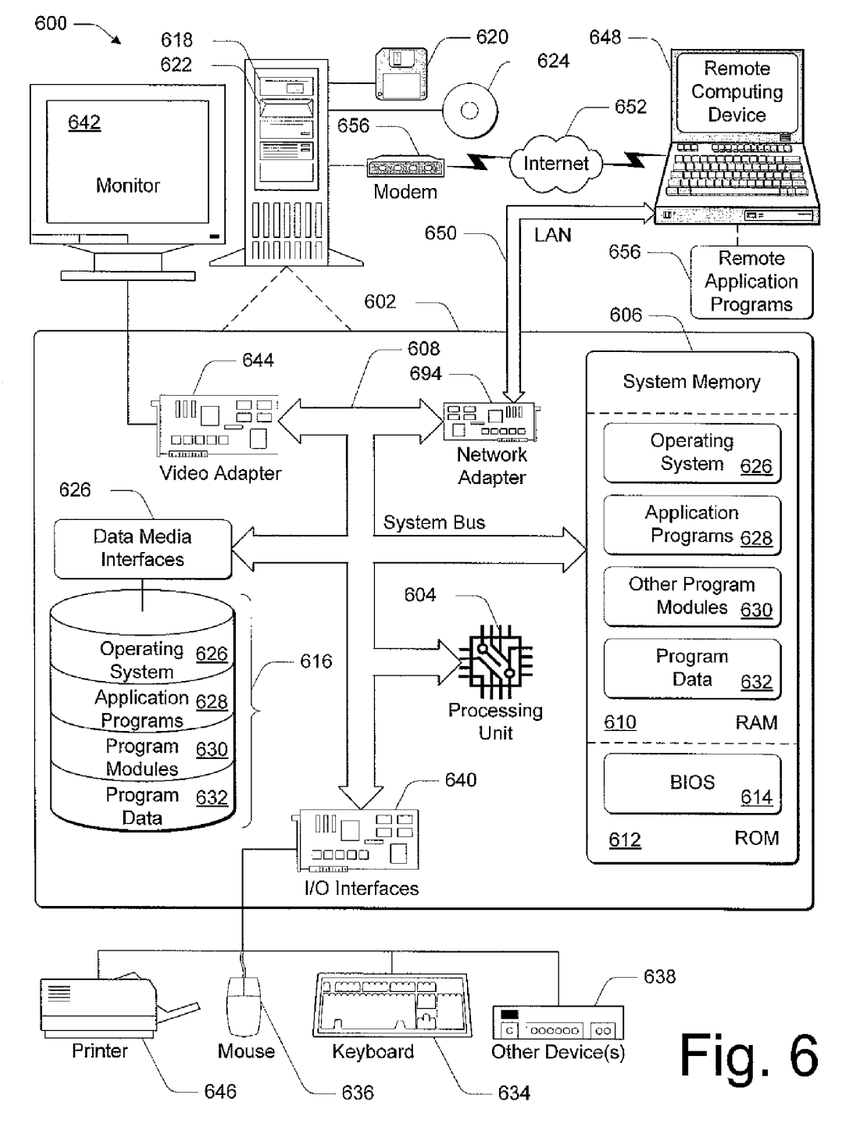
FIG. 6 is an example of a computing operating environment capable of implementing the present inventions claimed herein.

FIG. 6 illustrates an example of a suitable computing environment 600 within which an exemplary audio recognizer; as described herein, may be implemented (either fully or partially). The computing environment 600 may be utilized in the computer and network architectures described herein.

The exemplary computing environment 600 is only one example of a computing environment and is not intended to suggest any limitation as to the scope of use or functionality of the computer and network architectures. Neither should the computing environment 600 be interpreted as having any dependency or requirement relating to any one or combination of components illustrated in the exemplary computing environment 600.

The exemplary audio recognizer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary audio recognizer may be described in the general context of computer-executable instructions, such as program modules, being executed by a computer. Generally, program modules include routines, programs, objects, components, data structures, etc. that perform particular tasks or implement particular abstract data types. Exemplary audio recognizer may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 602. The components of computer 602 can include, by are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 910 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a digital audio signal hashing unit, a watermark encoder, transformer, a statistics estimator, an adaptive quantizer, an error-correction decoder, and a hasher.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Computer-Executable Instructions

An implementation of a system and or method utilizing certificates with digital content may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 600 in which a system and/or method of utilizing certificates with digital content may be implemented. Specifically, the systems and methods described herein may be implemented (wholly or in part) by any program modules 628-630 and/or operating system 628 in FIG. 6 or a portion thereof.

The operating environment is only an example of a suitable operating environment and is not intended to suggest any limitation as to the scope or use of functionality of the systems and methods described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer-Readable Media

An implementation of a system and/or method for utilizing certificates with digital content may be stored on or transmitted across some form of computer readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An electronic device for playing a digital content file, the electronic device comprising:
   processing means for processing a digital content file;
   memory;
   detection means for detecting the presence of a watermark signal in the digital content file; and
   authentication means for authenticating the digital content file; the authentication means including (i) accessing means for accessing a certificate, which indicates permissible uses of the digital content file, that is associated with and separate from the digital content file and (ii) determination means for determining from the certificate how the processing means is authorized to process the digital content file in the event that the detection means detects the watermark signal.

2. The electronic device as recited in claim 1, wherein the accessing means is configured to access the certificate in a remote location.

3. The electronic device as recited in claim 2, wherein the watermark signal is a 1-bit watermark signal.

4. The electronic device as recited in claim 1, wherein:
   the certificate that is associated with the digital content file indicates that the digital content file may be played but not copied; and
   the authentication means is configured to limit the processing means to playing the digital content file.

5. The electronic device as recited in claim 1, wherein:
   the certificate that is associated with the digital content file indicates that the digital content file may be not be played after a specified date; and
   the authentication means is configured to prevent the processing means from playing the digital content file after the specified date.

6. The electronic device as recited in claim 1, wherein:
   the certificate that is associated with the digital content file indicates that the digital content file may be played one time only; and
   the authentication means is configured to limit the processing means to playing the digital content file only one time.

7. The electronic device as recited in claim 1, wherein:
   the certificate that is associated with the digital content file indicates that the digital content file belongs to the public domain; and
   the authentication means is configured to allow the processing means to play and copy the digital content file an unlimited number of times.

8. The electronic device as recited in claim 1, wherein the digital content file is an audio file.

9. The electronic device as recited in claim 1, wherein the digital content file is a video file.

10. The electronic device as recited in claim 1, wherein the digital content file is a multimedia file.

11. One or more computer-readable storage media containing computer-executable instructions configured to perform the following:
attempting to detect a watermark signal in a digital content file;
if the watermark signal is detected, attempting to locate a certificate associated with the digital content file, the certificate including copyright information having at least one indication regarding a permissible use of the digital content file; and
if the watermark signal is detected and the associated certificate is located, processing the digital content file according to the copyright information included in the certificate.

12. The one or more computer-readable storage media as recited in claim 11, wherein the certificate is stored in a remote location relative to the digital content file.

13. The one or more computer-readable storage media as recited in claim 11, further comprising:
if the watermark signal is detected and the associated certificate is not located, preventing processing of the digital content file.

14. The one or more computer-readable storage media as recited in claim 11, further comprising:
allowing unlimited processing of the digital content file if the watermark signal is not detected.

15. The one or more computer-readable storage media as recited in claim 11, wherein the watermark signal further comprises a 1-bit watermark signal.

\* \* \* \* \*